Nov. 5, 1929.                R. R. ROTH                 1,734,830
EMERGENCY REPAIR LINK
Filed March 1, 1928
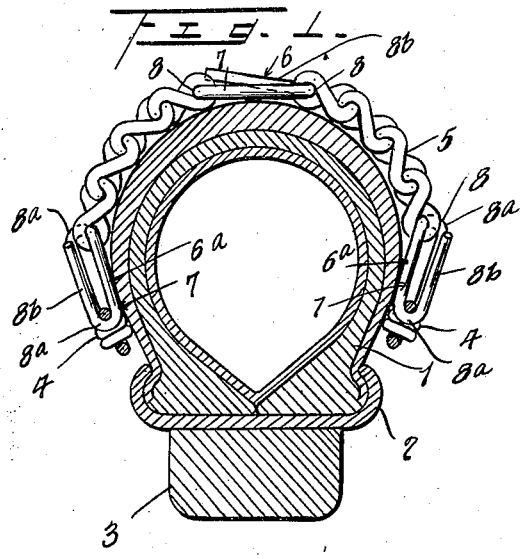
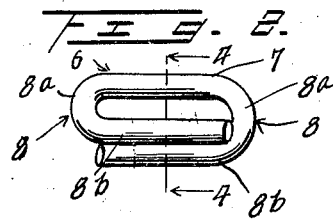
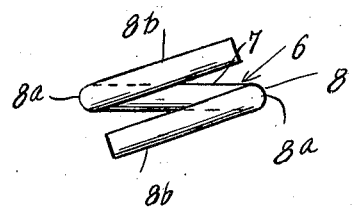
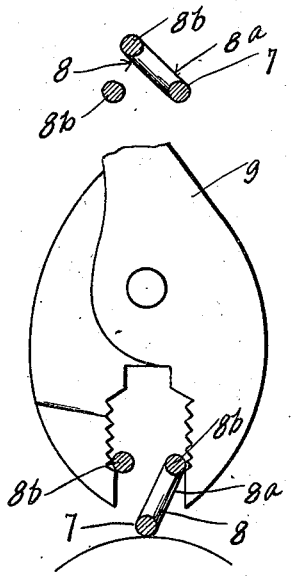
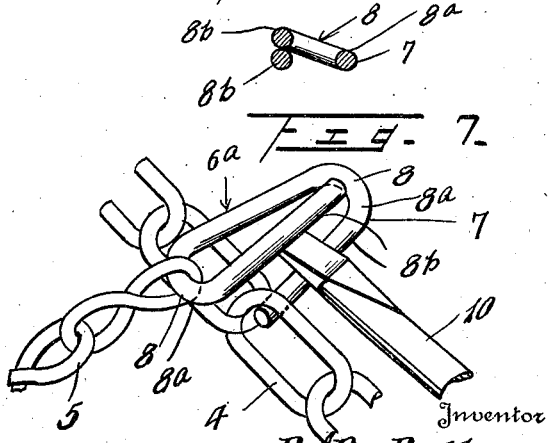
Inventor
R. R. Roth.

Patented Nov. 5, 1929

1,734,830

UNITED STATES PATENT OFFICE

ROBERT R. ROTH, OF THOMAS, WEST VIRGINIA

EMERGENCY REPAIR LINK

Application filed March 1, 1928. Serial No. 258,305.

This invention relates to improvements in emergency repair links of that type used for the purpose of rejoining the ends of broken cross chains of anti-skid tire chains, and more particularly to improvements in that link of this type that comprises a body and open loops located at the ends of the body and having their free end portions extending inwardly beyond each other and arranged in parallel relation to each other and to the body. When the loops of this link are closed, the free end portions thereof occupy angular positions with respect to the body, the free terminals of the free end portions are positioned in the loops, and one of the free end portions occupies an angular position with respect to the tread of the tire and with its free terminal next to the tread. While this link has been used in connection with anti-skid chains on high pressure tires without puncturing the same, it is not adapted for use in connection with anti-skid chains on low pressure tires for the reason that the free terminal of that free end portion occupying an angular position with respect to the tread of the tire would be forced in comparatively short time through the casing and inner tube of the tire. Furthermore, when this link is worn through the parts thereof remain attached to the ends of the cross chain sections and can not be removed except by a special chain tool, and if they are not removed the cross chain sections must be removed from the side chains and a new cross chain substituted therefor.

The present invention has for one of its objects to improve this link to the end that it may be used on low pressure tires without danger of puncturing the same, to the end that it may be more readily closed, and to the end that when worn through the parts thereof will become automatically detached from the cross chain sections, and to attain these ends the invention comprehends the arrangement of the free end portions of the loops in such a manner with respect to each other and to the body as to cause them, when the loops are closed, to rest one upon the other in substantially parallel position with respect to the body and to the tread of the tire.

A further object of the invention is to provide a link of the character stated which shall be also adapted to be used to connect the cross chains to the side chains.

With the foregoing and other objects in view, the nature of which will become apparent as the description proceeds, the invention consists of the novel combination and arrangement of parts hereinafter fully described and claimed, and illustrated in the accompanying drawing, wherein:

Figure 1 is a sectional view taken on a plane extending transversely through a pneumatic tire and anti-skid chain of which the latter is shown as having a cross chain repaired and connected to the side chains by links embodying my invention, Figure 2 is a detail plan view of the link, Figure 3 is a view in side elevation of the link, Figure 4 is a sectional view taken on the plane indicated by the line 4—4 of Figure 2, Figure 5 is a view illustrating the manner in which the loops of the link are closed, Figure 6 is a sectional view taken on a plane extending transversely through the closed link, and Figure 7 is a view illustrating the manner in which the link is engaged with the cross and side chains.

Referring to the drawings by reference characters, 1 designates a pneumatic tire which is shown applied to the rim 2 of a wheel 3, and which is shown equipped with an anti-skid chain comprising side chains 4 and cross chains. Only one of the cross chains is illustrated, and such chain 5 is shown as having been broken or worn through and the sections thereof connected together by my improved link 6.

The link 6 is made from a single piece of round wire stock of hard carbon steel, and comprises a straight body 7 and loops 8. The loops 8 are located at the ends of the body 7, and embody arcuate portions $8^a$ and straight free end portions $8^b$. The end portions $8^b$ extend inwardly beyond each other, and are together with the arcuate portions $8^a$ arranged at an angle to the body 7 and parallel to each other. The end portion $8^b$ of each of the loops 8 extends to the arcuate portion $8^a$ of the other loop, as clearly shown in Figures 1, 2 and 3.

As the arcuate and straight end portions of the respective loops 8 are arranged in parallel planes located at an angle to the body 7, the link may be readily engaged with the broken ends of a cross chain and then closed without removing the anti-skid chain from the tire. The link may be closed by pressure exerted on the ends 8$^b$ during rotation of the wheel or through the medium of a tool such as the pliers 9 shown in the drawing, and during this operation the end portions 8$^b$ of the loops 8 are moved in the direction of each other. When the link is closed one of the end portions 8$^b$ rests upon the other, and both of said portions are in substantially parallel relation with the body 7 and the tread of the tire. Due to the length and to this arrangement of the end portions 8$^b$, the terminals of said portions are positioned laterally beyond the center of the tread of the tire and there is no possibility of either of said portions being forced into the tire, and owing thereto the link is adapted for use in connection with anti-skid chains applied to either low pressure or high pressure tires with all liability of the puncturing of the tires obviated. Furthermore, the relative arrangement of the ends 8$^b$ of the loops 8 and their arrangement with respect to the body 7, permit the link to be readily closed, and the length of the end portions 8$^b$ provides the link with two wearing surfaces. When the outer of said ends 8$^b$ wears beyond a predetermined degree, the other end 8$^b$ will be forced into its place and assumes the wear.

The cross chains of the anti-skid device are connected to the side chains by links 6$^a$ which are similar in construction to the link 6. The parts of the links 6$^a$ are designated by the same reference characters designating similar parts of the link 6. To permit the links 6$^a$ to be easily engaged with the cross and side chains, the end portions 8$^b$ thereof are separated to the required extent by a screw driver 10 which to accomplish this purpose is inserted between the end portions and then slightly turned, as shown in Figure 7. After being engaged with the cross and side chains, the links 6$^a$ are closed in the manner hereinbefore set forth. Due to their construction, the links 6$^a$ are cheaper, lighter and more efficient than the means now employed to connect the side and cross chains, and may be more readily engaged with and removed from such chains.

What is claimed is:—

A link of the character described, comprising a body having loops extending from the opposite ends thereof, the material forming said body and loops being of uniform cross section, and said loops being in planes at other than right angles to one another and having ends in parallelism to and overlying one another both when the link is open and closed.

In testimony whereof I affix my signature.

ROBERT R. ROTH.